(12) United States Patent
Wright et al.

(10) Patent No.: US 6,666,280 B1
(45) Date of Patent: Dec. 23, 2003

(54) SOIL CULTIVATING APPARATUS

(75) Inventors: Philip Wright, Boston (GB); Adrian Hartley, Grantham (GB); Carl Rear, Boston (GB)

(73) Assignee: Simba International Ltd. (GB)

( * ) Notice: Subject to any disclaimer, the term of this patent is extended or adjusted under 35 U.S.C. 154(b) by 0 days.

(21) Appl. No.: 09/913,099

(22) PCT Filed: Feb. 9, 2000

(86) PCT No.: PCT/GB00/00408

§ 371 (c)(1),
(2), (4) Date: Oct. 3, 2001

(87) PCT Pub. No.: WO00/47033

PCT Pub. Date: Aug. 17, 2000

(30) Foreign Application Priority Data

Feb. 9, 1999 (GB) .............................................. 9902740

(51) Int. Cl.$^7$ .............................................. A01B 35/18
(52) U.S. Cl. ...................................... 172/178; 172/454
(58) Field of Search ................................ 172/138, 148, 172/146, 178, 319, 140, 145, 149, 414, 458, 454, 462–470, 483, 488, 489, 570, 572, 611, 710

(56) References Cited

U.S. PATENT DOCUMENTS

| | | | |
|---|---|---|---|
| 1,473,519 A | | 11/1923 | Rolli |
| 2,161,705 A | | 6/1939 | Haines |
| 4,492,272 A | * | 1/1985 | Jensen .................. 172/178 |
| 4,932,476 A | | 6/1990 | Hoehn |
| 5,462,123 A | * | 10/1995 | Harlan et al. ............. 172/454 |
| 5,590,721 A | * | 1/1997 | Van Mill .................. 172/138 |

FOREIGN PATENT DOCUMENTS

| | | |
|---|---|---|
| DE | 20 16 231 A | 10/1971 |
| DE | 92 05 660 U | 8/1992 |
| EP | 0 887 002 A1 | 12/1998 |
| WO | WO 85 03839 A | 9/1985 |

OTHER PUBLICATIONS

Prior art *eversagro b.v.* brochure for STACCATO Apparatus, three pages –No date.

\* cited by examiner

*Primary Examiner*—Robert E. Pezzuto
(74) *Attorney, Agent, or Firm*—Barnes & Thornburg

(57) ABSTRACT

A soil cultivating apparatus 10 comprises a chassis 14 having an elongate spine 16 carrying support outriggers 18, 20. The support outriggers 18 carry a first disc gang 30. The support outriggers 20 are arranged rearwardly of the support outriggers 18 and carry a second disc gang 40. A soil consolidating roller 38 or a soil consolidating press cultivator 42 is arranged between the first and second disc gangs. In one aspect ground-engaging tines 34 are arranged between the first disc gang and the soil consolidating roller or press cultivator.

46 Claims, 4 Drawing Sheets

SOIL CULTIVATING APPARATUS

CROSS-REFERENCE TO RELATED APPLICATION

This application is a U.S. national application of international application serial No. PCT/GB00/00408 filed Feb. 9, 2000, which claims priority to Great Britain Patent Application No. 9902740.1 filed Feb. 9, 1999.

The invention relates to a soil cultivating apparatus, particularly for use in arable cultivation.

Traditional ploughing of land for cultivation is increasingly being replaced by soil cultivating devices which include discs and tines etc. Normally, several operations are required in order to prepare a field for drilling with seed for the following season. Each operation requires a further pass over the field which can disturb the effect of the previous operation and also increases the unit cost of arable production in terms of fuel usage and farmer's time. Particularly in places with unpredictable weather conditions the requirements for several operations to be conducted on a field prior to seed drilling may, due to inclement weather, put back the date at which the ground can be planted with seed.

SUMMARY OF THE INVENTION

It is an object of the present invention to provide an improved form of soil cultivating apparatus.

According to a first aspect of the invention there is provided a soil cultivating apparatus comprising a chassis, a first disc gang carried by the chassis, a soil consolidating means comprising a roller carried on an axle on the chassis arranged behind the first disc gang, the roller comprising a resilient material and being arranged to consolidate the surface of the soil and a second disc gang arranged behind the soil consolidating roller.

In that way the second disc gang operates in optimum conditions attacking firmed soil.

Preferably, the soil consolidating roller comprises a plurality of wheels, having tyres of resilient material.

In a preferred embodiment, the tyres are rubber tyres.

According to another aspect of the invention there is provided a soil cultivating apparatus comprising a chassis, a first disc gang carried by the chassis, a soil cultivating means comprising a press carried on an axle on the chassis arranged behind the first disc gang and a second disc gang arranged behind the soil consolidating press, the press comprising a plurality of press rings, each press ring having two spaced-apart faces, a circular peripheral rim between the faces and having a larger diameter than the faces, and smooth sinusoidially-curved surfaces between the respective faces and the rim, the rim being arranged to act into the subsurface of the soil while the curved surfaces consolidate the surface of the soil.

Ground engaging tines may be provided, preferably arranged between the first disc gang and the soil consolidating roller.

Preferably the disc gangs and soil consolidating roller are arranged substantially symmetrically about the longitudinal axis of the chassis.

According to a further aspect of the invention, there is provided a soil cultivating apparatus comprising a chassis, a first disc gang carried by the chassis, a row of ground-engaging tines carried by the chassis arranged behind the first disc gang, soil consolidating means carried by the chassis arranged behind the row of tines and a second disc gang carried by the chassis arranged between the soil consolidating means.

In that way all of the operations required to cultivate the soil and subsoil can be achieved in a single pass. The first disc gang is operating in firm soil conditions, which is the preferred form of operation of discs, to incorporate into the soil surface the remains of the previous years crop. The ground engaging tines, which are arranged behind the first disc gang cultivate the subsoil to provide a beneficial drainage profile for the soil. The soil consolidating means consolidates the soil surface which has been loosened by the first disc gang and tines so that the second disc gang can also operate in a firmed soil profile to complete the cultivation process.

Preferably the disc gangs, tines and soil consolidating means are arranged substantially symmetrically about the longitudinal axis of the chassis.

The first disc gang may comprise two rows of discs, one each side of the longitudinal axis of the chassis, arranged transverse to the longitudinal axis. The second disc gang may be arranged in similar fashion.

The first disc gang is preferably arranged so that the outermost disc of each row lies forwardly of the innermost disc. In such a case, the second disc gang may be arranged so that the outermost disc of each row is arranged rearwardly of each respective innermost disc. In that way, the soil being cultivated is thrown outwardly of the longitudinal axis of the chassis by the first disc gang and returned inwardly by the second disc gang leaving a level soil profile.

The tines may be moveable from a ground engaging position to a position clear of the ground. In a preferred embodiment the tines may be set to variable heights between the ground engaging position and the position clear of the ground. In that way different levels of sub soil cultivation can be achieved. The movement may be effected individually or as a set. Preferably the tines are moveable automatically in response to an obstruction and in such a case a sensor is preferably provided for sensing when the tines have met an obstruction, for example a large submerged stone or an area of particularly consolidated soil. Additionally, the tines may be moveable by the operator of the soil cultivating apparatus, for example where no sub soil cultivation is required.

The soil consolidating means preferably comprises a roller carried on an axle on the chassis. The roller may comprise a plurality of rubber tyred wheels arranged on the axle. Alternatively, the roller may comprise a press cultivator having a plurality of press rings. Most preferably the press cultivator employs press rings of the type shown in our co-pending British Application Number 9813497.6 and European Patent Application Number 98304976.8.

A further press cultivator may be arranged behind the second disc gang, either carried by the chassis or as a separate piece of apparatus.

The soil cultivating apparatus may be 6 meters in width and other widths are envisaged, for example 3 meters and 4.5 meters.

BRIEF DESCRIPTION OF THE DRAWINGS

Soil cultivating apparatuses in accordance with the invention will now be described in detail by way of example and with reference to the accompanying drawings in which.

DESCRIPTION OF THE PREFERRED EMBODIMENT

Figure 1:
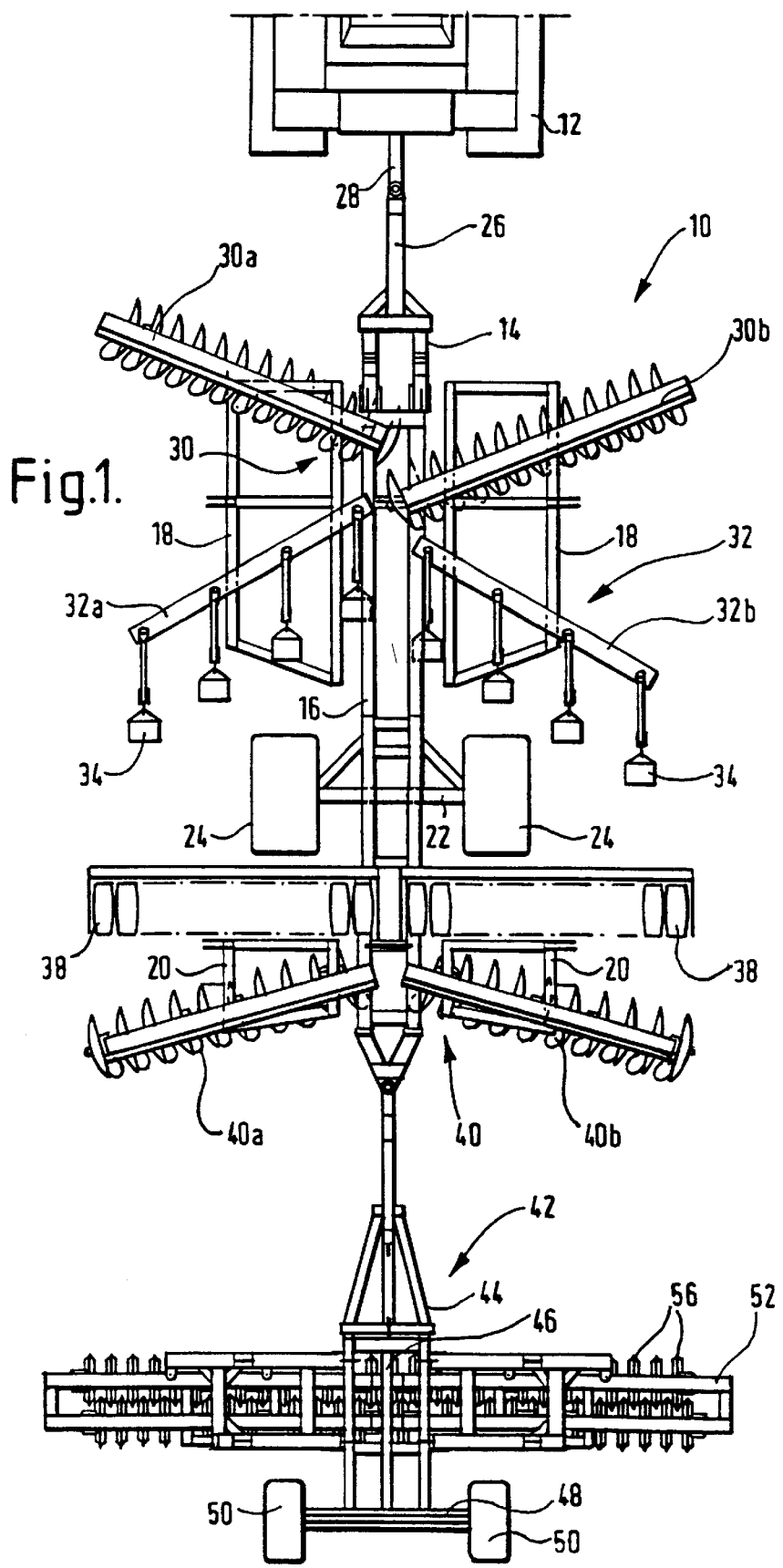
FIG. 1, is a plan view of a first soil cultivating apparatus in accordance with the invention.

In FIG. 1, a soil cultivating apparatus 10 in accordance with the invention is shown being towed by a tractor 12.

The soil cultivating apparatus 10 comprises a chassis 14 comprising an elongate spine 16 carrying support outriggers 18, 20. The chassis 16 carries towards a mid-portion thereof an axle 22 bearing a pair of road going wheels 24. The axle 22 can be pivoted from a position where the road going wheels 24 engage the ground and support the remainder of the soil cultivating apparatus 10 clear of the ground to a position where the axle 22 lies substantially flush with the spine 16 of the chassis 14.

The support outriggers 18 are arranged forwardly as the wheels 24 and the support outriggers 20 are arranged rearwardly as the wheels 24. The chassis 14 includes, at a forward end thereof, a trailer hitch 26 for attachment to a trailer bar 28 of the tractor 12.

The front outriggers 18 are arranged symmetrically about the spine 16 of the chassis 14 and support forward part respective left and right hand parts of a first disc gang 30. Each part 30a, 30b of the first disc gang 30 is arranged so that the outermost disc, ie the disc spaced laterally furthermost from the spine 16 lies forward of the respective innermost disc. The left hand part 30a, as viewed in FIG. 1, is arranged slightly ahead of the right hand part 30b of the first disc gang and the innermost disc of the left hand part 30a lies directly ahead of the innermost disc of the right hand part 30b along the spine 16 of the chassis 14. Viewed in plan, the first disc gang 30 forms a rough chevron with the point of the chevron towards the rear of the chassis 14, in other words away from the trailer hitch 26.

The outriggers 18 also support respective left and right hand parts 32a, 32b of a row of ground engaging tines 34. As with the first disc gang 30, the tines 34 are arranged in a chevron, this time with the point of the chevron towards the front of the chassis 14. The row 32 of tines is arranged behind the first disc gang 30 and ahead of the axle 22.

Rearwardly of the axle 22 there is an axle 36 which carries a plurality of soil consolidating rubber tyred wheels 38. The axle 36 carrying the rubber tyred wheels 38 is located ahead of the outriggers 20 on the chassis 14.

The outriggers 20 carry left and right parts 40a, 40b of a second disc gang. In the second disc gang the outermost disc of each respective left and right hand part is arranged rearwardly of the respective innermost disc so as to form a chevron with the point towards the front of the chassis 14.

In that way, the soil which is thrown outwardly by the first disc gang 30 is returned to leave a level soil profile by the second disc gang 40.

Optionally, as shown in FIG. 1 a press cultivator 42 may be hitched to the rear of the soil cultivating apparatus 10 to be towed behind the apparatus. The press cultivator 42 comprises a chassis 44 having a longitudinal part 46 carrying an axle 48 which bears a pair of road going wheels 50. The chassis 44 further comprises a transverse part 52 which carries two transverse axles 54. Each axle carries a plurality of press rings 56, most preferably press rings of the type shown in our co-pending British Patent Application Number 9813497.6. The press rings 56 on each axle are arranged with a space between each ring and the two axles 54 are arranged so that the press rings 56 on the second i.e. rearmost axle 54 are arranged directly behind the spaces between the press rings 56 on the first axle 54.

In use, the soil cultivating apparatus 10 is pulled across a field to be cultivated by the tractor 12. It is intended that the cultivating apparatus is used to incorporate the remains of the previous seasons crop into the top layer of the soil and to carry out complete conditioning of the entire soil and sub soil profile so as to replace several operations with a single operation on the field. The first disc gang 30 encounters virgin ground and turns the ground over to incorporate the remains of the previous seasons crop into a layer of the top soil to allow it to rot and to incorporate its nutrients into the uppermost layer of the soil. Discs of the kind shown in FIG. 1 work best in firm ground so it is preferable that those discs are arranged at the front of the cultivating apparatus.

The tines then work at a much deeper level to promote a beneficial drainage profile to the sub soil. That is done by breaking up deep clods of soil and rearranging the clods so that they cannot easily resettle into a configuration which is not conducive to drainage.

After the first disc gang and the tines have passed it will be appreciated that the soil profile is considerably looser than the virgin ground encountered by the first disc gang. Accordingly, the set of rubber tyred wheels encounters the loosened soil profile and serves to consolidate the soil profile into a firmed surface. In addition to consolidating the soil profile the tyres serve further to break down the previous crop which has been macerated and incorporated into the soil surface by the first disc gang.

The second disc gang is arranged rearwardly of the rubber tyred wheels 38 so that the second disc gang encounters a newly firmed soil profile. The second disc gang serves further to incorporate and macerate previous crop remains. The first and second disc gangs are arranged so as to throw the soil in opposite directions so that after passage of the apparatus 10 a level soil profile is provided.

The press cultivator 42 serves further to break down the previous crop and smash any clods produced by the discs 40. The press cultivator 42 produces a soil profile which promotes early weed germination and provides excellent weathering characteristics.

Figure 2:
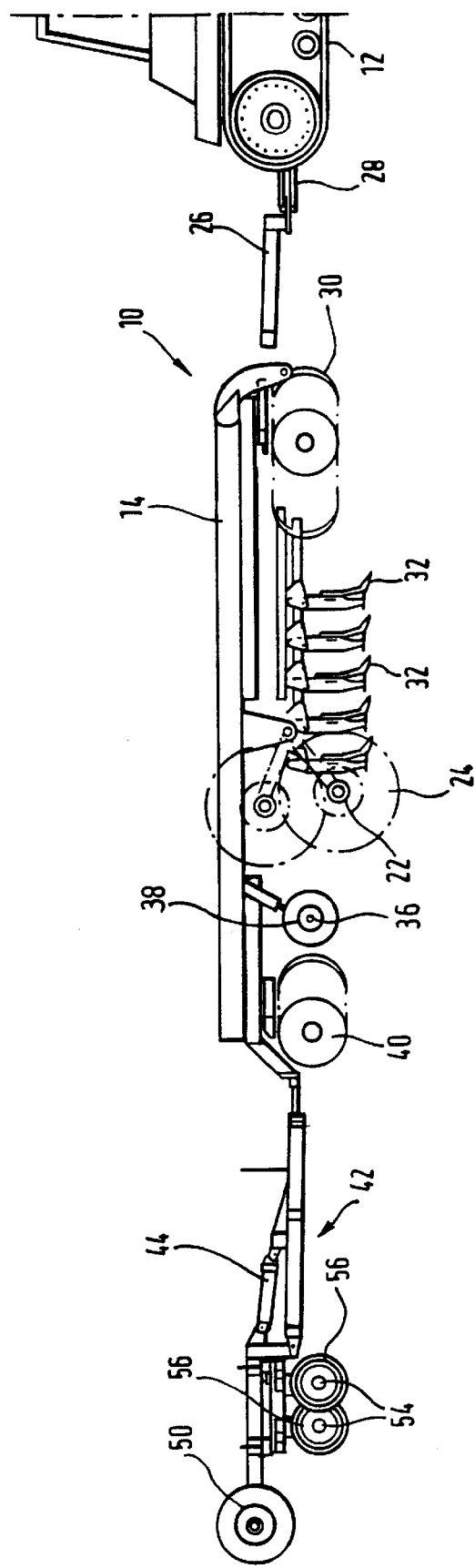
FIG. 2, is a side elevation of the apparatus of FIG. 1, FIG. 3, is a plan view of a second soil cultivating apparatus in accordance with the invention.
Figure 3:
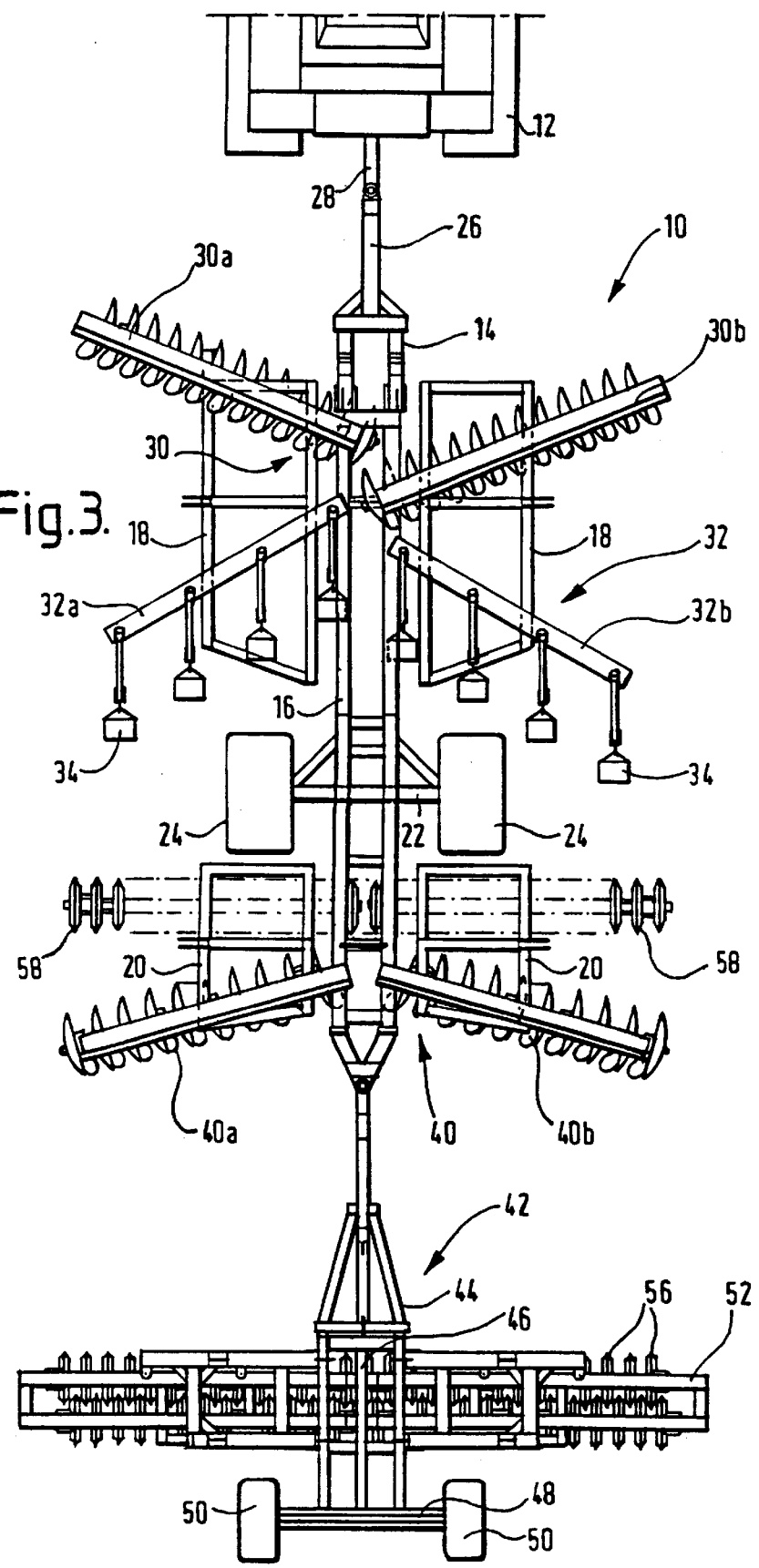
Figure 4:
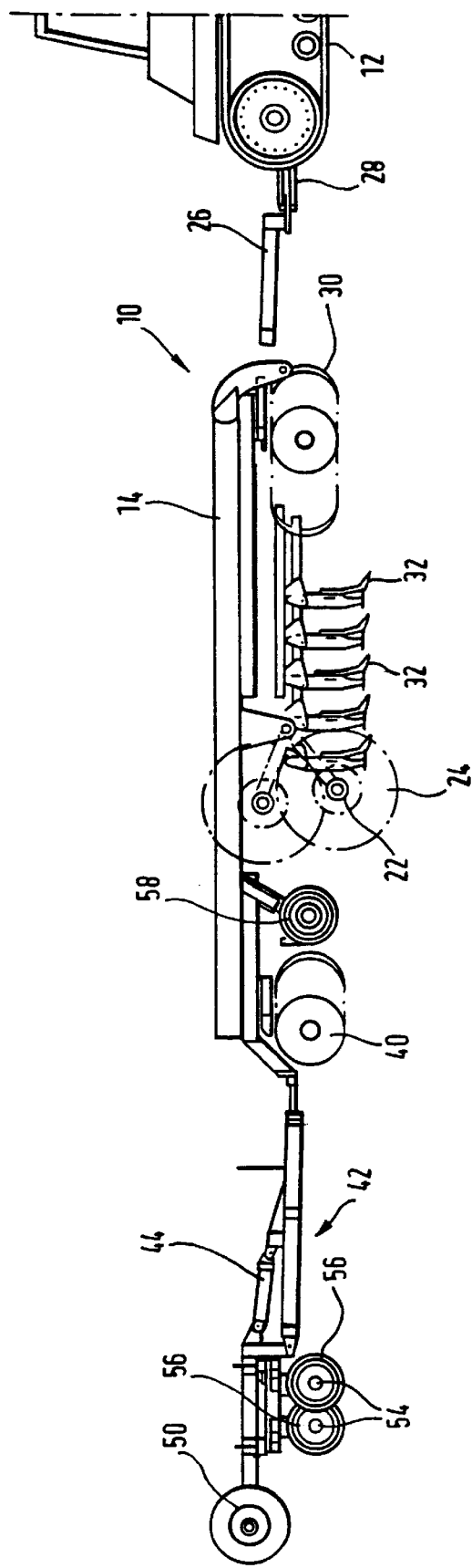
FIG. 4, is a side elevation of the apparatus of FIG. 3.

The embodiment shown in FIGS. 3 and 4 is substantially similar to that shown in FIGS. 1 and 2. Parts corresponding to parts in FIGS. 1 and 2 carry the same reference numerals. The soil cultivating apparatus 10 shown in FIG. 3 is largely the same as that shown in FIGS. 1 and 2, comprising a chassis 14 having a central spine 16 with outriggers 18, 20. The front outriggers 18 carry the first disc gang 30 and the row of tines 32. A road going wheel carrying axle 22 is mounted rearwardly of the tines 32. The second disc gang 40 is mounted at the rear of the chassis 14.

In place of the row of rubber tyred wheels 38, in the embodiment of FIG. 3 a row of press rings 58 is provided and those press rings carry out a similar function to the row of rubber tyred wheels 38, serving to consolidate the loosened soil profile ahead of the second disc gang 40. The press rings 58 also act at a deeper level on the soil profile into the subsurface of the soil to provide a soil profile optionally prepared for the oncoming second disc gang 40.

As in FIGS. 1 and 2 a press cultivator 42, which is optional, is hitched to the rear of the chassis 14.

The tines 34 in both embodiments described may be raised or lowered to an appropriate depth depending upon the soil type being cultivated by the apparatus. In some cases, sub soil treatment is not necessary and so the tines can be lifted from the ground completely. In other cases, the sub soil cultivation depth may be less than other soils so the depth can be chosen by the user of the apparatus. Additionally, the apparatus may be provided with a sensor (not shown) which determines when a tine or tines has encountered an obstruction, for example a submerged boulder, and the tines can be lifted automatically over the obstruction to avoid damage to the apparatus. In such a case, the movement is effected by means of hydraulics. The tines may be arranged to be moved individually or as a set or both. In addition, it is envisaged that the tines may be moved during transit upon initiation by the user of the apparatus so that parts of a field which require sub soil cultivation can be cultivated appropriately and the tines lifted out of the ground for those parts of the file which do not require cultivation. That allows the most appropriate form of cultivation to be applied to each part of the field and also reduces the energy requirement and thus fuel expenditure of the user by reducing the draft requirement of the apparatus for those parts of the field that do not require substantial sub soil cultivation. It is envisaged that the movement of the tines may be linked to a location finder, such as a GPS system and an on-board computer to control movement of the tines in and out of the ground dependent upon a previous mapping of the location.

The present invention provides an improved soil cultivating apparatus which, potentially, allows all of the soil cultivating steps required to be carried out in a single pass over the field. Once the field has been so treated, early weed germination is encouraged to allow lower grade pesticides to be used to kill off weeds in a single treatment in advance of drilling the ground with seed.

What is claimed is:

1. A soil cultivating apparatus comprising a chassis, the chassis carrying a first disc gang, a row of ground engaging tines arranged behind said first disc gang, soil consolidating means comprising a press carried on an axle of said chassis, said press comprising a plurality of press rings, each press ring having two spaced apart faces, a circular peripheral rim between the faces and having a larger diameter than the spaced faces, and smooth sinusoidally-curved surfaces between respective faces and said rim, said rim being arranged to act into the subsurface of the soil while said curved surfaces consolidate the surface of the soil.

2. A soil cultivating apparatus comprising a chassis, the chassis carrying:
   a first disc gang,
   a row of ground-engaging tines arranged behind said first disc gang,
   soil consolidation means arranged behind said row of ground-engaging tines and arranged to effect consolidation of the soil across the width of the cultivating apparatus, and
   a second disc gang arranged behind said soil consolidating means.

3. A soil cultivating apparatus comprising,
   a chassis having a set of transport wheels, the chassis further carrying: a first disc gang,
   a row of ground-engaging tines behind said first disc gang,
   soil consolidating means arranged behind said row of ground-engaging tines, and
   a second disc gang arranged behind said soil consolidating means.

4. A soil cultivating apparatus according to claim 3, wherein said ground-engaging tines and said soil consolidating means are arranged substantially symmetrically about a longitudinal axis of said chassis.

5. A soil cultivating apparatus according to claim 3, wherein said soil consolidating means comprises a roller carried on an axle on said chassis, said roller comprising a resilient material.

6. A soil cultivating apparatus according to claim 5, wherein said soil consolidating means comprises a plurality of wheels, having tyres of resilient material.

7. A soil cultivating apparatus according to claim 6, wherein said tyres are rubber tyres.

8. A soil cultivating apparatus according to claim 3, wherein said soil consolidating means comprises a press carried on an axle of said chassis, said press comprising a plurality of press rings, each press ring having two spaced-apart faces, a circular peripheral rim between the faces and having a larger diameter than the spaced-apart faces, and smooth sinusoidally-curved surfaces between respective faces and said rim, said rim being arranged to act into subsurface of soil while said curved surfaces consolidate surface of soil.

9. A soil cultivating apparatus according to claim 3, wherein said first disc gang comprises two rows of disc, one row on each side of a longitudinal axis of said chassis and each row being arranged transverse to said longitudinal axis.

10. A soil cultivating apparatus according to claim 3, wherein said second disc gang comprises two rows of discs, one row on each side of a longitudinal axis of said chassis and each row being arranged transverse to said longitudinal axis.

11. A soil cultivating apparatus according to claim 3, wherein said first disc gang comprises two rows of disc, one row on each side of a longitudinal axis of said chassis and each row of discs being arranged transverse to said longitudinal axis, each row having an innermost disc and an outermost disc, and said first disc gang is arranged so that said outermost disc of each row lies forwardly of said innermost disc.

12. A soil cultivating apparatus according to claim 11, wherein said second disc gang two rows of discs, one row on each side of a longitudinal axis of said chassis and each row being arranged transverse to said longitudinal axis, said second disc gang comprises an innermost disc and an outermost disc, and the outermost disc of each row is arranged rearwardly of each respective innermost disc.

13. A soil cultivating apparatus according to claim 3, wherein said ground-engaging tines are movable from a first (ground-engaging) position to a second position where they are clear of the ground.

14. A soil cultivating apparatus according to claim 13, wherein said ground-engaging tines are settable to a plurality of first (ground-engaging) positions of varying depths.

15. A soil cultivating apparatus according to claim 13, wherein said movement of the tines is effected individually.

16. A soil cultivating apparatus according to claim 3, wherein said tines are moveable automatically in response to an obstruction.

17. A soil cultivating apparatus according to claim 3, wherein a sensor is provided for sensing when a tine has met an obstruction.

18. A soil cultivating apparatus according to claim 3, wherein a further press cultivator is arranged behind the second disc gang.

19. A soil cultivating apparatus according to claim 18, wherein said further press cultivator is carried as a separate piece of apparatus.

20. A soil cultivating apparatus according to claim 3, wherein said roller comprises a plurality of wheels, said plurality of wheels having tyres of resilient material.

21. A soil cultivating apparatus according to claim 4, wherein said tyres are rubber tyres.

22. A soil cultivating apparatus according to claim 3, wherein said soil cultivating apparatus further comprises ground-engaging tines.

23. A soil cultivating apparatus according to claim 5, wherein said tines are movable from a first (ground-engaging) position to a second position where they are clear of the ground.

24. A soil cultivating apparatus according to claim 6, wherein said tines are settable to variable heights between said first (ground-engaging) position and said second position clear of the ground.

25. A soil cultivating apparatus according to claim 6, wherein movement of said tines is effectable individually.

26. A soil cultivating apparatus according to claim 5, wherein said tines are moveable automatically in response to an obstruction.

27. A soil cultivating apparatus according to claim 5, wherein said soil cultivating apparatus provides a sensor for sensing when one of said tines meets an obstruction.

28. A soil cultivating apparatus according to claim 5, wherein said tines are arranged between said first disc gang and said soil consolidating means.

29. A soil cultivating apparatus according to claim 3, wherein said first and second disc gangs and soil consolidating roller are arranged substantially symmetrically about a longitudinal axis of said chassis.

30. A soil cultivating apparatus according to claim 3, wherein said first disc gang comprises two rows of discs, one row on each side of a longitudinal axis of said chassis and each row being arranged transverse to said longitudinal axis.

31. A soil cultivating apparatus according to claim 3, wherein said second disc gang comprises two rows of discs, one row on each side of a longitudinal axis of said chassis and each row being arranged transverse to said longitudinal axis.

32. A soil cultivating apparatus according to claim 3, said first disc gang comprises two rows of discs, one row on each side of a longitudinal axis of said chassis and each row being arranged transverse to said longitudinal axis, each row having a innermost disc and an outermost disc, wherein said outermost disc of each row is arranged to lie forwardly of said innermost disc.

33. A soil cultivating apparatus according to claim 11, wherein said second disc gang comprises two rows of discs, one row on each side of a longitudinal axis of said chassis and each row being arranged transverse to said longitudinal axis, and wherein in the second disc gang an outermost disc of each row is arranged rearwardly of each respective innermost disc.

34. A soil cultivating apparatus according to claim 3, wherein said soil cultivating apparatus comprises a further press cultivator arranged behind said second disc gang.

35. A soil cultivating apparatus according to claim 18, wherein said further press cultivator is carried as a separate piece of apparatus.

36. A soil cultivating apparatus according to claim 34, wherein said first disc gang comprises two rows of discs, one row on each side of longitudinal axis of said chassis and each row being arranged transverse to said longitudinal axis.

37. A soil cultivating apparatus according to claim 34, wherein said second disc gang comprises two rows of discs, one row on each side of a longitudinal axis of said chassis and each row being arranged transverse to said longitudinal axis.

38. A soil cultivating apparatus according to claim 34, wherein said first disc gang comprises two rows of disc, one row on each side of a longitudinal axis of said chassis and each row of discs being arranged transverse to said longitudinal axis, each row having an innermost disc and an outermost disc, and said first disc gang is arranged so that said outermost disc of each row lies forwardly of said innermost disc.

39. A soil cultivating apparatus according to claim 37, wherein said second disc gang two rows of discs, one row on each side of a longitudinal axis of said chassis and each row being arranged transverse to said longitudinal axis, said second disc gang comprises an innermost disc and an outermost disc, and the outermost disc of each row is arranged rearwardly of each respective innermost disc.

40. A soil cultivating apparatus according to claim 34, wherein said ground-engaging tines are movable from a first (ground-engaging) position to a second position where they are clear of the ground.

41. A soil cultivating apparatus according to claim 40, wherein said ground-engaging tines are settable to variable heights between the first (ground-engaging) position and the second position where they are clear of the ground.

42. A soil cultivating apparatus according to claim 41, wherein said movement of the tines is effected individually.

43. A soil cultivating apparatus according to claim 34, wherein said tines are moveable automatically in response to an obstruction.

44. A soil cultivating apparatus according to claim 34, wherein a sensor is provided for sensing when a tine has met an obstruction.

45. A soil cultivating apparatus according to claim 34, wherein a further press cultivator is arranged behind the second disc gang.

46. A soil cultivating apparatus according to claim 45, wherein said further press cultivator is carried as a separate piece of apparatus.

* * * * *